United States Patent
Erdler et al.

(10) Patent No.: US 8,592,091 B2
(45) Date of Patent: Nov. 26, 2013

(54) METHOD FOR PRODUCING A PROTON-CONDUCTING, STRUCTURED ELECTROLYTE MEMBRANE

(75) Inventors: Gilbert Erdler, Freiburg (DE); Holger Reinecke, Emmendingen (DE); Mirko Frank, Freudenstadt (DE); Claas Mueller, Freiburg (DE); Jochen Kerres, Ostfildern (DE)

(73) Assignee: Micronas GmbH, Freiburg (DE)

(*) Notice: Subject to any disclaimer, the term of this patent is extended or adjusted under 35 U.S.C. 154(b) by 328 days.

(21) Appl. No.: 12/987,772

(22) Filed: Jan. 10, 2011

(65) Prior Publication Data

US 2011/0217659 A1 Sep. 8, 2011

Related U.S. Application Data

(63) Continuation of application No. PCT/EP2008/010477, filed on Dec. 10, 2008.

(30) Foreign Application Priority Data

Jul. 9, 2008 (EP) .................................... 08012393

(51) Int. Cl.
H01M 8/00 (2006.01)
(52) U.S. Cl.
USPC .......................................... 429/400; 427/115
(58) Field of Classification Search
None
See application file for complete search history.

(56) References Cited

U.S. PATENT DOCUMENTS

| | | | |
|---|---|---|---|
| 5,028,337 A * | 7/1991 | Linder et al. .................. | 210/642 |
| 8,026,016 B2 | 9/2011 | Cho et al. | |
| 2003/0087141 A1 * | 5/2003 | Sun et al. .................... | 429/30 |
| 2004/0166392 A1 * | 8/2004 | Shah et al. .................... | 429/36 |
| 2006/0127727 A1 | 6/2006 | Lee et al. | |
| 2007/0117958 A1 | 5/2007 | Mohwald et al. | |
| 2007/0259242 A1 * | 11/2007 | Schaevitz et al. ............... | 429/34 |
| 2008/0003485 A1 | 1/2008 | Krishnan et al. | |

FOREIGN PATENT DOCUMENTS

| | | |
|---|---|---|
| CN | 1986613 A | 6/2007 |
| DE | 103 09 135 A1 | 9/2004 |
| JP | 2004-026889 | 1/2004 |
| JP | 2008-037897 A | 2/2008 |

OTHER PUBLICATIONS

T. Pichonat et al., "A new proton-conducting porous silicon membrane for small fuel cells", Chemical Engineering Journal 101 (2004), pp. 107-111.

English translation of Chinese Office Action for Chinese Application No. 20088013295.7 dated Mar. 28, 2013.

* cited by examiner

Primary Examiner — Patrick Ryan
Assistant Examiner — Jose Colucci Rios
(74) Attorney, Agent, or Firm — Muncy, Geissler, Olds & Lowe, PLLC

(57) ABSTRACT

In a method for producing a proton-conductive, structured electrolyte membrane, particularly for a fuel cell, a coating, which comprises at least one ion-conductive cross-linking component having at least one acid group and at least one photoactive substances interacting therewith, is applied onto a solid body surface. The coating is optically masked in that at least one region of the coating, in which the electrolyte membrane is supposed to be, is exposed such that the cross-linking component cross-links with the photoactive substances to form a polymer and/or copolymer network adhering to the solid body surface. At least one unexposed region of the coating is removed in order to structure the electrolyte membrane.

20 Claims, 3 Drawing Sheets

METHOD FOR PRODUCING A PROTON-CONDUCTING, STRUCTURED ELECTROLYTE MEMBRANE

This nonprovisional application is a continuation of International Application No. PCT/EP2008/010477, which was filed on Dec. 10, 2008, and which claims priority to European Patent Application No. EP 08012393.8, which was filed on Jul. 9, 2008, and which are both herein incorporated by reference.

BACKGROUND OF THE INVENTION

1. Field of the Invention

The present invention relates to a method for producing a proton-conducting, structured electrolyte membrane, especially for a fuel cell.

2. Description of the Background Art

Batteries and accumulators can be replaced by fuel cells. These typically have a hydrogen storage system, a first electrode acting as the anode, a second electrode acting as the cathode, and a membrane which is located between the electrodes and is connected to the hydrogen storage system. The membrane is permeable to protons and impermeable to hydrogen. In micro fuel cells, a film, usually obtainable commercially under the name DuPont™ Nafion® PFSA membrane, is used as the electrolyte membrane. The electrolyte membrane contains chemically stabilized sulfonic acid groups, which enable a high ionic conductivity.

In a method known from the conventional art, during the production of the fuel cell the film is structured by cutting and made into the required shape. The film is then arranged between the electrodes. Typically, a plurality of such fuel cells is stacked one above the other and connected in series. The film has the disadvantage, however, that it enables only limited miniaturization of the fuel cell, because the structured film is still difficult to handle if its dimensions are small. It is disadvantageous in addition that tolerances, which make the miniaturization of the fuel cell difficult, occur during the trimming of the film.

In T. Pichonat et al., "A new protein-conducting porous silicon membrane for small fuel cells", Chemical Engineering Journal 101 (2004), pages 107-111, further, a method for producing a structured electrolyte membrane is disclosed, in which a silicon wafer is coated on both sides by a metallic layer applied by sputtering. A mask of a photoresist is then applied to this layer and next at the places where no photoresist is arranged, the wall thickness of the wafer is reduced by double-sided etching of the silicon, to form an open-pore silicon membrane, which has a surface of about 3 mm×3 mm. The silicon membrane is then filled with a Nafion® solution and next the solvent contained therein is evaporated so that only the Nafion® remains in the pores. This method also enables only limited miniaturization of the membrane, because the charging of the silicon membrane with the Nafion® solution is difficult with small membrane dimensions.

SUMMARY OF THE INVENTION

It is therefore an object of the present invention to provide a method that enables a high degree of miniaturization of the electrolyte membrane in a simple manner. This object is achieved in an embodiment, by a method for producing a proton-conducting, structured electrolyte membrane, especially for a fuel cell, in which a coating is applied to a solid body surface, whereby the coating contains at least one ion-conducting cross-linking component, having at least one acid group, and at least one photoactive substance interacting therewith, whereby the coating is masked optically by exposing to light at least one area of the coating where the electrolyte membrane is supposed to be, in such a way that the cross-linking component cross-links with the photoactive substance to form a polymer and/or copolymer network adhering to the solid body surface, whereby then for structuring of the electrolyte membrane at least one unexposed area of the coating is removed, and/or whereby the coating contains at least one ion-conducting cross-linking component, having at least one acid group, and at least one photoactive substance interacting therewith, which after application to the solid body surface are cross-linked to form a hydrophobic polymer and/or copolymer network, adhering to the solid body surface, whereby the coating is optically masked by exposing to light at least one area of the coating where the electrolyte membrane is not supposed to be, in such a way that it becomes hydrophilic by a chemical reaction, whereby then for structuring of the electrolyte membrane at the least one exposed area of the coating is removed, and/or whereby the coating contains at least one ion-conducting cross-linking component, having at least one acid group, and at least one photoactive substance interacting therewith, which after application to the solid body surface are cross-linked to form a hydrophilic polymer and/or copolymer network, adhering to the solid body surface, whereby the coating is optically masked by exposing to light at least one area of the coating where the electrolyte membrane is supposed to be, in such a way that it becomes hydrophobic by a chemical reaction, whereby then for structuring of the electrolyte membrane at least one unexposed area of the coating is removed and/or whereby the coating contains at least one ion-conducting cross-linking component, having at least one acid group, which after application to the solid body surface is cross-linked to form a polymer and/or copolymer network, adhering to the solid body surface, whereby the coating is optically masked by exposing to light at least one area of the coating where the electrolyte membrane is not supposed to be, in such a way that the polymer and/or copolymer chains are broken, whereby then for structuring of the electrolyte membrane the at least one exposed area of the coating is removed.

In an embodiment, the coating, applied to the solid body surface, is structured by a standard lithography process. In this regard, preferably at places where the optical radiation, such as, e.g., UV light, strikes the coating, the photoactive substance is activated and thereby a cross-linking is started. It is also possible, however, to apply first a hydrophilic polymer and/or copolymer network in a planar manner to the solid body surface and then to expose to light the places where the electrolyte membrane is supposed to be (positive photoresist), to make the coating hydrophobic at the exposed areas by a chemical reaction. The unexposed areas of the coating are then removed, for example, by planar contacting of the coating with a developer, in which the non-cross-linked cross-linking component and optionally the photoactive substance or the hydrophilic places dissolve.

It is possible, further, to apply first a hydrophobic polymer and/or copolymer network to the solid body surface and then to expose to light the places where the electrolyte membrane is not supposed to be (negative photoresist), to make the coating hydrophilic at the exposed areas by a chemical reaction. The exposed hydrophilic areas of the coating are then removed, preferably by planar contacting of the coating with a developer.

Alternatively, a polymer and/or copolymer network can also be applied in a planar manner to the solid body surface. After this, at the places where the electrolyte membrane is not supposed to be, polymer and/or copolymer chains, contained in the coating, are broken by exposure to high-energy radiation to dissolve these in a developer afterwards by contacting with said developer and to remove them from the solid body surface.

A finely structured electrolyte membrane with very compact dimensions can be produced with the aid of the method.

In an embodiment of the method, the cross-linking component and the at least one photoactive substance, dissolved in a solvent, are applied to the solid body surface preferably by spin coating, and the solvent is then evaporated to form the coating. The coating is therefore applied by a process step that has become established and has been tested in the semiconductor industry, namely spin coating. The method therefore can be integrated well into a standard semiconductor fabrication process.

The cross-linking component can have at least one acid group, especially a sulfonic acid group, a phosphoric acid group, and/or a carboxylic acid group. The electrolyte membrane produced according to the method then has a high proton conductivity.

It is advantageous when the cross-linking component contains sulfonated poly(ether ketone) and/or sulfonated poly(ether ether ketone). The sulfonated poly(ether ether ketone) can have following structural formula:

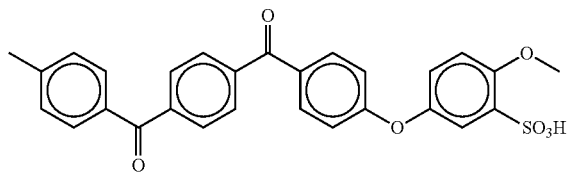

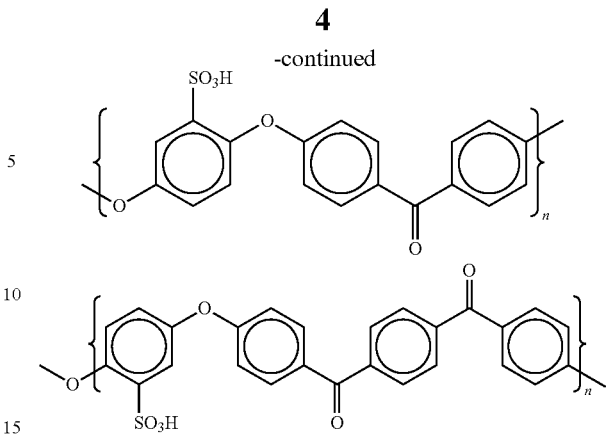

The electrolyte membrane then has a still higher proton conductivity.

In an embodiment of the invention, the photoactive substance contains a photoinitiator, especially (2,4,6-trimethylbenzoyl)diphenylphosphine oxide. The photo-initiator can be obtained commercially under the name Lucirin® TPO-L and has the following structural formula:

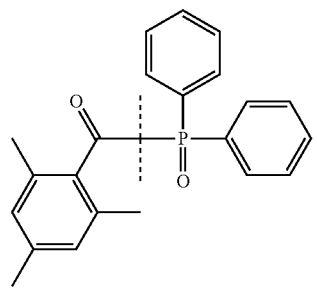

The photoactive substance can contain a copolymer, especially trimethylolpropane triacetate. Said copolymer can be obtained commercially under the name Laromer® TMPTA and has following structural formula:

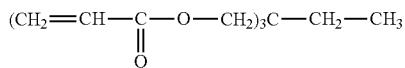

It is advantageous when the coating contains an adhesive component, preferably polybenzimidazole. As a result, the adhesion of the electrolyte membrane particularly to a metal hydride hydrogen storage system, integrated into a silicon substrate, can be improved. The structural formula of polybenzimidazole is:

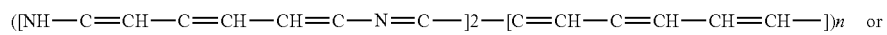 or

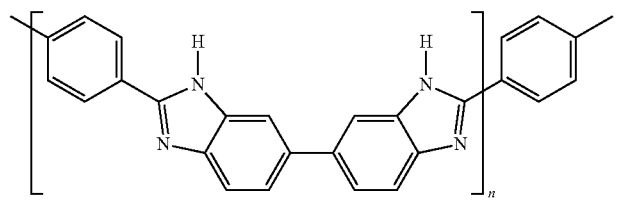

The method of the invention can be integrated into a method for producing at least one fuel cell, said method in which a semiconductor substrate is provided, on which a hydrogen storage layer is formed, whereby the electrolyte membrane is formed on the hydrogen storage layer and whereby on the opposite side of the electrolyte membrane a cathode permeable to air and/or oxygen is formed. A fuel cell can therefore be integrated monolithically into a semiconductor substrate with the method. It is even possible in this case to integrate a plurality of fuel cells next to one another in the semiconductor substrate and to connect them electrically in series. The semiconductor substrate is preferably a silicon substrate. The hydrogen storage layer preferably contains palladium, which is applied to the semiconductor substrate by means of a conventional galvanic process, screen printing, and/or a thin-layer method, such as sputtering or vapor deposition. The method of the invention can be used in particular in a CMOS process.

In an embodiment of the invention, the coating is removed from the solid body surface as a film before exposure and then positioned on the assembly formed at least from the semiconductor substrate and the hydrogen storage layer in such a way that the film covers the hydrogen storage layer in a planar manner. In this embodiment of the invention as well, the coating is structured directly on the hydrogen storage layer or the semiconductor substrate. Because of the simpler integration into a semiconductor fabrication process, it is preferable, however, to apply the coating by means of spin coating to the assembly formed at least from the semiconductor substrate and the hydrogen storage layer.

It is advantageous if a cavity or depression is formed in the semiconductor substrate and if the depression is filled with the hydrogen storage layer. The at least one fuel cell can thereby be integrated in a planar manner into the semiconductor substrate.

In an embodiment of the invention, a stress compensation layer is formed from a ductile metal in the depression, the hydrogen storage layer being applied to the stress compensation layer. It is avoided as a result that cracks arise in the fuel cell integrated monolithically into the semiconductor substrate, particularly in the case of a relatively thick hydrogen storage layer, when the hydrogen storage layer changes its volume during the charging and/or discharging of hydrogen. The ductile metal can contain in particular tin, gold, silver, lead, cadmium, and/or indium. Tin is especially preferred because of its environmental compatibility.

It is advantageous when a diffusion barrier is formed in the depression to inhibit or block the passage of hydrogen, whereby the hydrogen storage layer and optionally the compensation layer are formed on the diffusion barrier. The fuel cell can then store hydrogen largely without losses for a long time period.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1A:
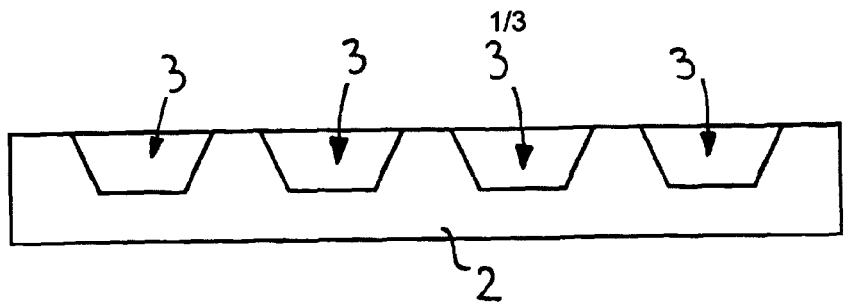
FIGS. 1A through 1I show process steps for producing a semiconductor chip having a plurality of fuel cells.

In a method for producing fuel cells 1, a semiconductor substrate 2 made of silicon is provided, in whose surface a number of cavities or depressions 3 are formed which corresponds to the number of fuel cells 1 to be produced and said cavities or depressions are spaced apart laterally from one another (FIG. 1A).

The depressions can be introduced into semiconductor substrate 2, for example, by wet chemical etching with $KOH^-$ or dry etching. In so doing, an etch-resistant mask, which has an opening in each case at the places where depressions 3 are to be, is applied first to the surface of semiconductor substrate 2. Then the surface of the assembly, having semiconductor substrate 2 and the etching mask, is brought into contact with an etchant over its entire surface, whereby at the places where the openings are, material is removed from semiconductor substrate 2 by a chemical reaction between the etchant and semiconductor substrate 2. After depressions 3 with the desired dimensions have been etched into semiconductor substrate 2, the etchant and the etch-resistant mask are removed from semiconductor substrate 2.

Figure 1B:
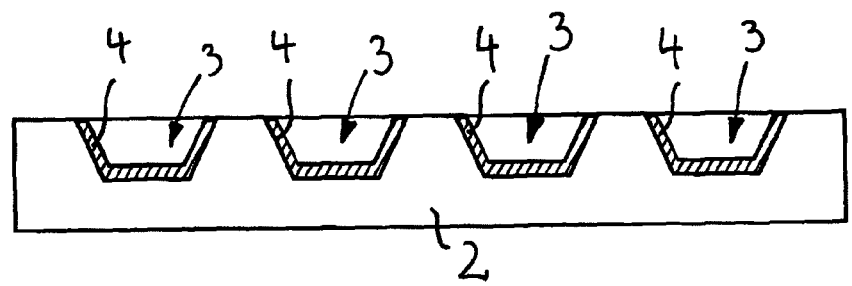

In another process step, a diffusion barrier 4 is formed in each case in depressions 3 to inhibit or block the passage of hydrogen. It is evident in FIG. 1B that diffusion barriers 4 completely cover the bottom and side walls of depressions 3.

Figure 1C:
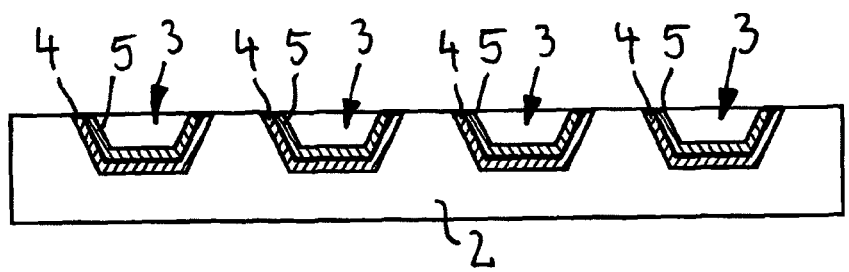

Next, a stress compensation layer 5 made of a ductile metal, such as, e.g., tin, is formed (FIG. 1C) on diffusion barriers 4. The stress compensation layers 5, assigned to the individual depressions 3, in each case completely cover the bottom and side walls of depressions 3.

It is also possible, however, to form diffusion barriers 4 on semiconductor substrate 2 first and then stress compensation layers 5 on diffusion barriers 4.

Figure 1D:
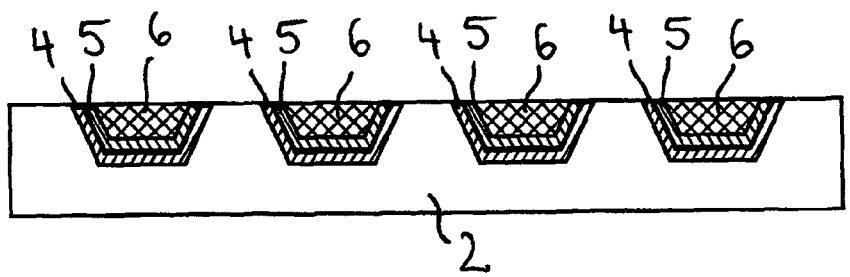

In another process step, shown in FIG. 1D, the remaining depressions 3 are filled with a hydrogen storage layer 6 of palladium, for example, by means of a conventional galvanic process. Next, a planarization of the surface occurs by means of a polishing machine, to obtain a uniformly even surface over semiconductor substrate 2, hydrogen storage layers 6, and the edges, projecting at the surface, of stress compensation layers 5 and diffusion barriers 4.

Figure 1E:
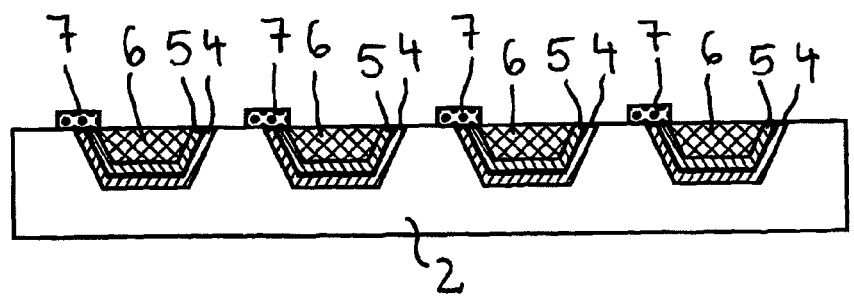

Then, first electrical electrodes 7 as anodes for fuel cells 1 are applied to the surface in such a way that in each case they contact one of the hydrogen storage layers 6 electrically. For this purpose, the surface at the places where the first electrical electrodes 7 are not supposed to be is initially covered with a mask by a lithography step and then an electrical contact layer, for example, a gold layer, is vapor deposited on the surface in a planar manner. This is structured by removing the mask to form the first electrodes 7 (FIG. 1E).

In another process step, a solution is provided, which contains the following components: (a) an ion-conducting cross-linking component, having at least one acid group, namely sulfonated poly(ether ether ketone); (b) a photoactive substance, which has a photoinitiator, namely (2,4,6-trimethyl-benzoyl)diphenylphosphine oxide, and a copolymer, namely trimethylolpropane triacetate; (c) optionally an adhesive agent component, namely polybenzimidazole; and (d) a solvent.

The solution is can be obtained by mixing the components together and stirring the mixture until components a), b), and optionally c) have dissolved completely in the solvent.

Figure 1F:
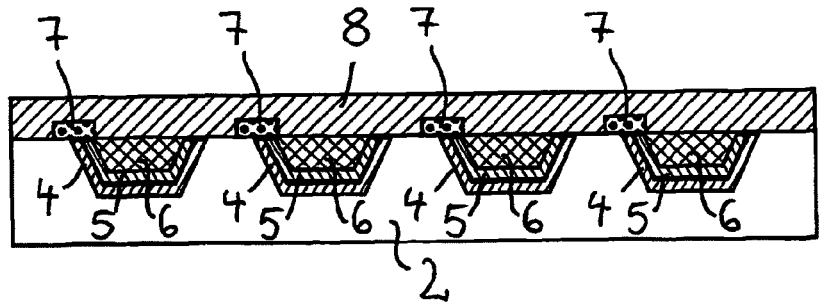

The thus obtained solution is now applied by means of spin coating over the entire surface to the solid body surface of the assembly having semiconductor substrate 2, diffusion barriers 4, stress compensation layers 5, hydrogen storage layers 6, and first electrodes 7. Then, the solvent is evaporated with heat treatment, so that only components a), b), and optionally c) remain on the solid body surface as coating 8 (FIG. 1F).

Figure 1G:
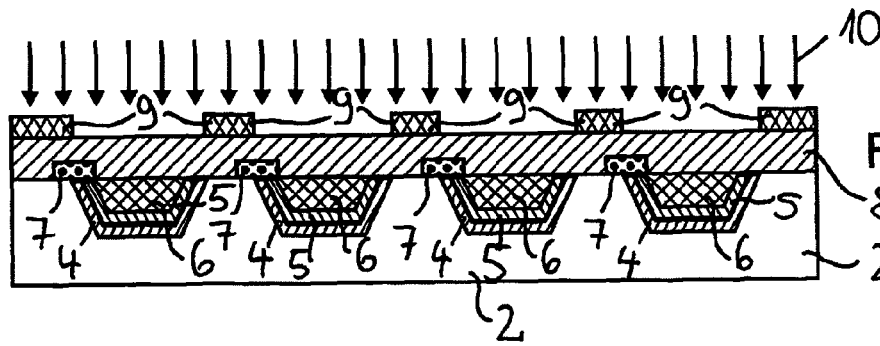

In another process step, a photomask 9, which covers the places where no electrolyte membrane is supposed to be, is applied to coating 8 by means of a lithography step (FIG. 1G).

Then, coating 8 is irradiated through photomask 9 with UV light 10. During the irradiation, cross-linking component a) and photoactive substance b) are cross-linked at the places not covered by photomask 9 in such a way that an electrolyte membrane 11 forms, which adheres to the areas adjacent thereto of diffusion barriers 4, stress compensation layers 5, hydrogen storage layers 6, and first electrodes 7. In contrast, no cross-linking occurs in the areas, covered by photomask 9, of coating 8.

Figure 1H:
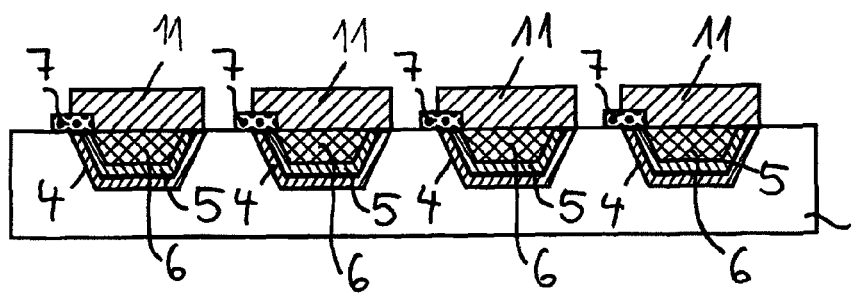

Now, photomask 9 and the non-cross-linked areas of the coating are removed from the solid body surface by contacting with a developer. It is evident in FIG. 1H that now each of the hydrogen storage layers 6 is coated in each case with an electrolyte membrane 11 and that electrolyte membranes 11, assigned to the individual hydrogen storage layers 6, are spaced apart laterally from one another. Electrolyte membranes 11 are permeable to protons but do not allow any hydrogen molecules to pass through.

In another process step, on the side, facing away from hydrogen storage layer 6, of electrolyte membrane 11, a second electrode 12, permeable to air and/or oxygen, is formed, which acts as a cathode for the fuel cell. The second electrodes 12 are preferably made from a current collector for electrical feedback to semiconductor substrate 2 and a fine platinum catalyst layer on electrolyte membrane 11. As a result, the second electrodes 12 are permeable to air or atmospheric oxygen, so that it can reach second electrode 12 from the atmosphere. For structuring the second electrodes 12, microstructured sputter masks can be used, which can be produced with an advanced deep silicon etching process from, for example, 300 μm-thick silicon wafers. The web width of the formed lamellar structure can be about 100 μm.

Figure 1I:
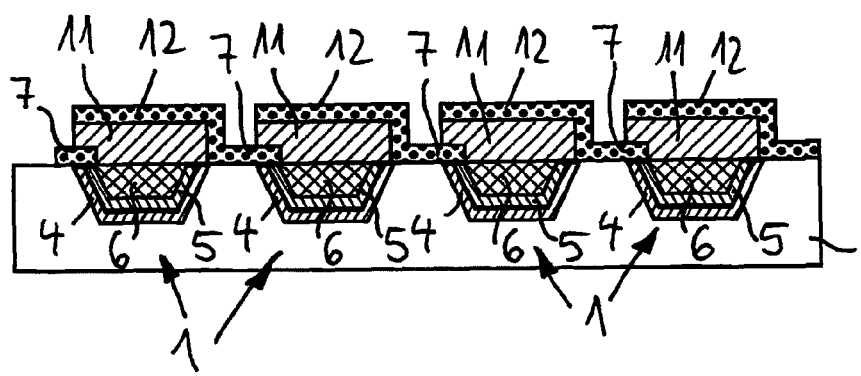

It is evident in FIG. 1I that a plurality of fuel cells 1 integrated into semiconductor substrate 2 are electrically connected in series. Second electrode 12 of a first fuel cell 1 is electrically connected for this purpose to first electrode 7 of a second fuel cell 1. Second electrode 12 of said first fuel cell 1 is in turn connected to first electrode 7 of another fuel cell 1, etc.

Figure 2:
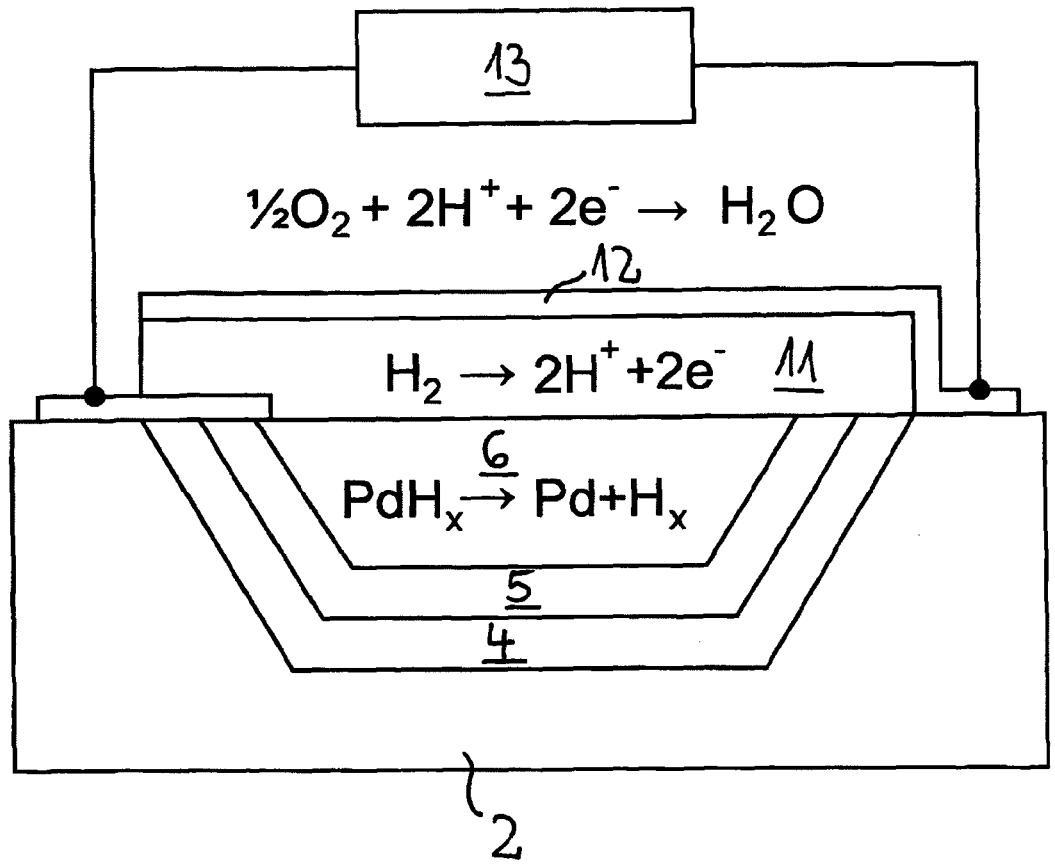
FIG. 2 shows schematically a side view of a cut fuel cell and in individual fuel cell regions reaction formulas for illustrating the chemical reaction proceeding during discharge.

The principle of operation of fuel cells 1 is evident on the basis of FIG. 2. The hydrogen in hydrogen storage layer 6 is cleaved into protons $H^+$ and electrons $e^-$ at the interface to electrolyte membranes 11. The electrons reach second electrode 12 via the first electrode and an electrical load 13 connected thereto. The protons diffuse through electrolyte membrane 11 to second electrode 12 permeable to atmospheric oxygen $O_2$ and react there with the electrons and the atmospheric oxygen with the release of water $H_2O$. An electric current therefore flows across load 13 between electrodes 7, 12.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for producing a proton-conducting structured electrolyte membrane for a fuel cell, the method comprising:
    providing a solid body surface; and
    applying a coating to the solid body surface,
    wherein the coating contains at least one ion-conducting cross-linking component having at least one acid group and at least one photoactive substance interacting therewith, at least one first area of the coating being masked optically by exposure to light such that the cross-linking component cross-links with the photoactive substance to form a polymer and/or copolymer network adhering to the solid body surface, whereby then, for structuring of the electrolyte membrane, at least one unexposed area of the coating is removed, and/or
    wherein the coating contains at least one ion-conducting cross-linking component having at least one acid group and at least one photoactive substance interacting therewith, which, after application to the solid body surface, are cross-linked to form a hydrophobic polymer and/or copolymer network adhering to the solid body surface, at least one second area of the coating being optically masked by exposure to light such that it becomes hydrophilic by a chemical reaction, whereby then for structuring of the electrolyte membrane the at least one second area of the coating is removed, and/or wherein the coating contains at least one ion-conducting cross-linking component having at least one acid group and at least one photoactive substance interacting therewith, which, after application to the solid body surface, are cross-linked to form a hydrophilic polymer and/or copolymer network adhering to the solid body surface, at least one first area of the coating being optically masked by exposure to light such that it becomes hydrophobic by a chemical reaction, whereby then for structuring of the electrolyte membrane at least one unexposed area of the coating is removed, and/or wherein the coating contains at least one ion-conducting cross-linking component having at least one acid group, which after application to the solid body surface is cross-linked to form a polymer and/or copolymer network adhering to the solid body surface, whereby at least one second area of the coating is optically masked by exposure to light such that the polymer and/or copolymer chains are broken, whereby then for structuring of the electrolyte membrane the at least one second area of the coating is removed.

2. The method according to claim 1, wherein the cross-linking component and the at least one photoactive substance, dissolved in a solvent, are applied to the solid body surface by spin coating and the solvent is then evaporated to form the coating.

3. The method according to claim 1, wherein the cross-linking component has at least one acid group, a sulfonic acid group, a phosphoric acid group, and/or a carboxylic acid group.

4. The method according to claim 1, wherein the cross-linking component contains sulfonated polyether ketone and/or sulfonated polyether ether ketone.

5. The method according to claim 1, wherein the photoactive substance contains a photoinitiator, or wherein the photoactive substance contains 2,4,6-trimethylbenzoyl diphenylphosphine oxide.

6. The method according to claim 1, wherein the photoactive substance contains a copolymer or wherein the photoactive substance contains trimethyloipropane triacetate.

7. The method according to claim 1, wherein the coating contains an adhesive component or polybenzimidazole.

8. The method for producing at least one fuel cell with an electrolyte membrane according to claim 1, wherein a semiconductor substrate is provided, on which a hydrogen storage layer is formed, the electrolyte membrane being formed on the hydrogen storage layer, and on an opposite side of the electrolyte membrane a cathode permeable to air and/or oxygen is formed.

9. The method according to claim 8, wherein the coating is removed from the solid body surface as a film before exposure and then positioned on the assembly formed at least from the semiconductor substrate and the hydrogen storage layer in such a way that the film covers the hydrogen storage layer in a planar manner.

10. The method according to claim 8, wherein a cavity or depression is formed in the semiconductor substrate and the depression is filled with the hydrogen storage layer.

11. The method according to claim 10, wherein a stress compensation layer is formed from a ductile metal in the depression, and the hydrogen storage layer is applied to the stress compensation layer.

12. The method according to claim 10, wherein a diffusion barrier is formed in the depression to inhibit or block the passage of hydrogen, and the hydrogen storage layer and optionally the compensation layer are formed on the diffusion barrier.

13. A method for producing a proton-conducting structured electrolyte membrane for at least one fuel cell, the method comprising:
providing a solid body having at least one depression in a surface of said solid body, each of said at least one depressions containing a fuel storage layer;
applying at least one first electrode to said surface each of said at least one first electrode contacting a respective one of said at least one fuel storage layers:
covering said surface including said at least one first electrode with a coating, wherein the coating contains at least one ion-conducting cross-linking component having at least one acid group and at least one photoactive substance interacting therewith;
applying a photomask to at least one first portion of said coating, wherein each of said at least one portion is positioned above a portion of said surface not containing any of said at least one fuel storage layer;
irradiating with ultraviolet light both said at least one first portion of said coating having said applied photomask and at least one second portion of said coating, wherein said irradiating of said coating on said at least one second portion forms cross-linking of said cross-linking component and said photoactive substance to thereby form at least one said electrolyte membrane; and
removing said photomask and said coating from said at least one first portion.

14. The method according to claim 13, wherein the cross-linking component and the at least one photoactive substance, dissolved in a solvent, are applied to the solid body surface by spin coating and the solvent is then evaporated to form the coating.

15. The method according to claim 13, wherein the cross-linking component has at least one acid group, a sulfonic acid group, a phosphoric acid group, and/or a carboxylic acid group.

16. The method according to claim 13, wherein the cross-linking component contains sulfonated polyether ketone and/or sulfonated polyether ether ketone.

17. The method according to claim 13, wherein the photoactive substance contains a photoinitiator, or wherein the photoactive substance contains 2,4,6-trimethylbenzoyl diphenylphosphine oxide.

18. The method according to claim 13, wherein the photoactive substance contains a copolymer or wherein the photoactive substance contains trimethylolpropane triacetate.

19. The method according to claim 13, wherein the coating contains an adhesive component or polybenzimidazole.

20. The method according to claim 13, wherein a stress compensation layer is formed from a ductile metal in each of the at least one depression, and the fuel storage layer is a hydrogen storage layer.

* * * * *